US012643652B2

(12) United States Patent
Lieven et al.

(10) Patent No.: US 12,643,652 B2
(45) Date of Patent: Jun. 2, 2026

(54) ASSEMBLY COMPRISING AT LEAST ONE CONNECTING ELEMENT AND AT LEAST TWO CONTACT SURFACES PROVIDED WITH ASPERITIES, AIRCRAFT COMPRISING AT LEAST ONE SUCH ASSEMBLY

(71) Applicant: Airbus Operations SAS, Toulouse (FR)

(72) Inventors: Patrick Lieven, Toulouse (FR);
Edmond Froger, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 22 days.

(21) Appl. No.: 18/769,034

(22) Filed: Jul. 10, 2024

(65) Prior Publication Data

US 2025/0026465 A1     Jan. 23, 2025

(30) Foreign Application Priority Data

Jul. 19, 2023     (FR) ....................................... 2307719

(51) Int. Cl.
| | |
|---|---|
| *B64C 1/06* | (2006.01) |
| *B64C 1/26* | (2006.01) |
| *F16B 2/00* | (2006.01) |
| *F16B 43/00* | (2006.01) |

(52) U.S. Cl.
CPC ................ *B64C 1/069* (2013.01); *B64C 1/26* (2013.01); *F16B 2/005* (2013.01); *F16B 43/00* (2013.01)

(58) Field of Classification Search
CPC . B64C 1/069; B64C 1/26; F16B 43/00; F16B 2/005
See application file for complete search history.

(56) References Cited

U.S. PATENT DOCUMENTS

| | | | | |
|---|---|---|---|---|
| 2,914,149 | A | * | 11/1959 | Walker .................. B65D 90/08 |
| | | | | 52/394 |
| 3,856,424 | A | * | 12/1974 | Beck, Jr. ................. F16B 43/00 |
| | | | | 403/408.1 |

(Continued)

FOREIGN PATENT DOCUMENTS

| | | | | |
|---|---|---|---|---|
| FR | 3127263 | A1 | 3/2023 | |
| GB | 2587391 | A * | 3/2021 | ................ B64F 5/10 |

(Continued)

OTHER PUBLICATIONS

French Search Report for corresponding French Patent Application No. 2307719 dated Jan. 19, 2024.

*Primary Examiner* — Brian M O'Hara
(74) *Attorney, Agent, or Firm* — Greer, Burns & Crain, Ltd.

(57) ABSTRACT

An assembly comprising at least first and second components, at least one connection element comprising a rod configured to ensure uptake of the traction/compression forces between the first and second components, and at least one pair of first and second contact surfaces provided respectively with first and second bumps and rigidly secured respectively to the first and second components, the first and second bumps having complementary shapes configured to nest in one another and ensure transmission of the shear forces between the first and second components. Also, an aircraft comprising at least one such assembly.

16 Claims, 5 Drawing Sheets

(56)        References Cited

U.S. PATENT DOCUMENTS

| | | | |
|---|---|---|---|
| 3,967,083 | A * | 6/1976 | Bould ........................ F16B 5/02 |
| | | | 411/959 |
| 8,210,475 | B2 * | 7/2012 | Burgunder ............ B64C 1/1492 |
| | | | 244/129.3 |
| 8,492,004 | B2 * | 7/2013 | Watanabe ............... F16B 43/00 |
| | | | 428/609 |
| 10,941,794 | B2 * | 3/2021 | Bui ......................... F16B 2/005 |
| 12,504,036 | B2 * | 12/2025 | Delcher .................. F16B 43/00 |
| 2012/0183801 | A1 | 7/2012 | Watanabe et al. |
| 2013/0170922 | A1 | 7/2013 | Persson |

FOREIGN PATENT DOCUMENTS

| | | | |
|---|---|---|---|
| WO | 2007119841 | A1 | 10/2007 |
| WO | 2011133090 | A1 | 10/2011 |
| WO | 2023287676 | A1 | 1/2023 |

* cited by examiner

ASSEMBLY COMPRISING AT LEAST ONE CONNECTING ELEMENT AND AT LEAST TWO CONTACT SURFACES PROVIDED WITH ASPERITIES, AIRCRAFT COMPRISING AT LEAST ONE SUCH ASSEMBLY

CROSS-REFERENCES TO RELATED APPLICATIONS

This application claims the benefit of French Patent Application Number 2307719 filed on Jul. 19, 2023, the entire disclosure of which is incorporated herein by way of reference.

FIELD OF THE INVENTION

The present application relates to an assembly comprising at least one connection element and at least two contact surfaces provided with bumps, and to an aircraft comprising at least one such assembly.

BACKGROUND OF THE INVENTION

According to an embodiment shown in FIG. 1, an assembly comprises at least first and second components 10, 12, each comprising inner and outer faces 10.1, 12.1, 10.2, 12.2 and a through hole 10.3, 12.3 connecting the inner and outer faces 10.1, 12.1, 10.2, 12.2. When the two components 10 and 12 are assembled, the inner faces 10.1, 12.1, which are smooth, are pressed against one another and the through holes 10.3, 12.3 are coaxial and have substantially the same diameter. The assembly comprises at least one connection element 14 which has a rod 14.1 received in the through holes 10.3, 12.3 and two stop elements 14.2, 14.3 connected by the rod 14.1 and pressed against the outer faces 10.2, 12.2 of the first and second components 10, 12.

The connection element 14 is configured to ensure transmission of the traction/compression and shear forces between the first and second components 10, 12. To ensure transmission of the shear forces, the through holes 10.3, 12.3 of the first and second components 10, 12 must be coaxial and have inside diameters which are substantially identical to one another and are adapted to the outside diameter of the rod 14.1 of the connection element 14. "Adapted to" means that there is a very small, or even zero, clearance between the rod 14.1 and the first and second components 10, 12.

When the first and second components 10, 12 correspond to first and second structures of an aircraft each made up of several elements assembled together, it is very difficult to obtain coaxial through holes 10.3, 12.3 before the first and second components 10, 12 are pre-positioned so as to be assembled. Consequently, to assemble the first and second components 10, 12, the latter are pre-positioned, drilled simultaneously so as to obtain through holes 10.3, 12.3 which are perfectly coaxial and have the same diameter, and then assembled by putting in place the connection element 14.

This method of assembly is not entirely satisfactory because it takes a relatively long time, which tends to increase the time required for assembly of an aircraft.

According to another drawback, when the first component is a component which has to be removed and put back in place several times during the operation of the aircraft, it is necessary for the through holes 10.3, 12.3 to be repositioned to ensure that they are coaxial each time it is put back in place. Consequently, upon each reassembly, the through holes 10.3, 12.3 of the first and second components 10, 12 must be remachined so that they are perfectly coaxial. This machining ends up increasing the diameter of the through holes 10.3, 12.3 such that the connection element 14 put back in place has to have a rod of larger cross section with a diameter adapted to that of the through holes 10.3, 12.3, now enlarged, and this tends to increase the weight on board. Moreover, in some cases, this machining operation is incompatible with some items of equipment located close to the through holes 10.3, 12.3.

The present invention aims to overcome all or some of the drawbacks of the prior art.

SUMMARY OF THE INVENTION

To this end, the invention relates to an assembly comprising at least first and second components and at least one connection element comprising a rod configured to ensure uptake of the traction/compression forces between the first and second components, the first component comprising a first inner face oriented toward the second component and a first through hole configured to receive the rod, the second component comprising a second inner face oriented toward the first component and a second through hole configured to receive the rod.

According to the invention, the assembly comprises at least one first plate interposed between the first and second inner faces of the first and second components, the first inner face of the first component being flat and smooth, the first plate being connected to the first component by at least one first attachment element configured to ensure at least partial uptake of the shear forces between the first and second components, said first plate comprising a flat and smooth first face pressed against the first inner face of the first component. Complementarily, the assembly comprises at least one pair of first and second contact surfaces pressed against one another, the first contact surface being rigidly secured to the first plate and provided with first bumps, the second contact surface being rigidly secured to the second component and provided with second bumps, the first and second bumps having complementary shapes configured to nest in one another and ensure transmission of the shear forces between the first and second components.

According to the invention, transmission of the shear forces is ensured by elements other than the rod of the connection element. Consequently, the through holes of the first and second components are not necessarily adapted to the diameter of the rod of the connection element and may be produced independently of one another, prior to assembly.

According to another feature, the assembly comprises a second plate interposed between the first plate and the second component, the second inner face of the second component being flat and smooth, the second plate being connected to the second component by at least one second attachment element configured to ensure at least partial uptake of the shear forces between the first and second components, said second plate comprising a first face corresponding to the second contact surface and a flat and smooth second face pressed against the second inner face of the second component.

According to another feature, each of the first and second plates includes at least one through hole for receiving the rod of the connection element.

According to another feature, each of the first and second plates comprises an extension through which at least one attachment element passes, having a thickness smaller than that of the rest of the plate.

According to another feature, at least one component out of the first and second components comprises at least one housing that is recessed relative to the first or second inner face of the first or second component, configured to receive at least the first or second plate.

According to another feature, the first and second bumps are respectively first and second ridges.

According to another feature, the first and second ridges are rectilinear and parallel to one another and oriented in a direction perpendicular to a direction of uptake of the shear forces.

According to another feature, the first and second ridges are circles that are concentric around the rod of the connection element.

According to another feature, the first and second ridges have a height of between 1 and 5 mm.

The invention also relates to an aircraft comprising at least one assembly according to one of the above features.

According to one application, the aircraft comprises a frame delimiting an opening, a removable panel configured to close off the opening and at least one assembly connecting the frame and the panel which correspond respectively to the first and second components of the assembly.

According to another application, the aircraft comprises at least two fuselage portions comprising respectively first and second transverse reinforcements pressed against one another and at least one assembly connecting the first and second transverse reinforcements which correspond respectively to the first and second components of the assembly.

According to another application, the aircraft comprises a center wing box comprising a first structure, a second structure and at least one assembly connecting the first and second structures which correspond respectively to the first and second components of the assembly.

The invention also relates to an assembly method comprising a step of positioning the first and second plates between the first and second components, at least one of them not being rigidly secured to the first or second component, a step of positioning the first and second components relative to one another in a desired position, a step of holding the first and second components in this desired position by putting in place at least one connection element, the first and second ridges nesting in one another as it is put in place, a step of attaching the first and second plates, not yet rigidly secured, respectively to the first and second components, each of the first and second plates being rigidly secured to the first or second component by at least one attachment element configured to ensure at least partial transmission of the shear forces between the first and second components.

According to another feature, the first and second ridges are configured as a function of the deformations of the first and second components upon disassembly so as to make up for said deformations upon reassembly.

According to another feature, the first and second ridges are oriented, upon assembly, perpendicularly to at least one direction of movement of the first and second components relative to one another upon disassembly.

BRIEF DESCRIPTION OF THE DRAWINGS

Further features and advantages will emerge from the description of the invention which is set out below, and which is provided purely by way of example, with reference to the attached drawings, in which:

FIG. 13 is a longitudinal section through a center wing box of an aircraft illustrating an embodiment of the invention, FIG. 14 is a cross section through a part of two structures of the center wing box connected by at least one assembly illustrating an embodiment of the invention, FIG. 15 is a face-on view of the assembly shown in FIG. 14.

DETAILED DESCRIPTION OF THE PREFERRED EMBODIMENTS

Figures 1, 2, 3, 4, 5:
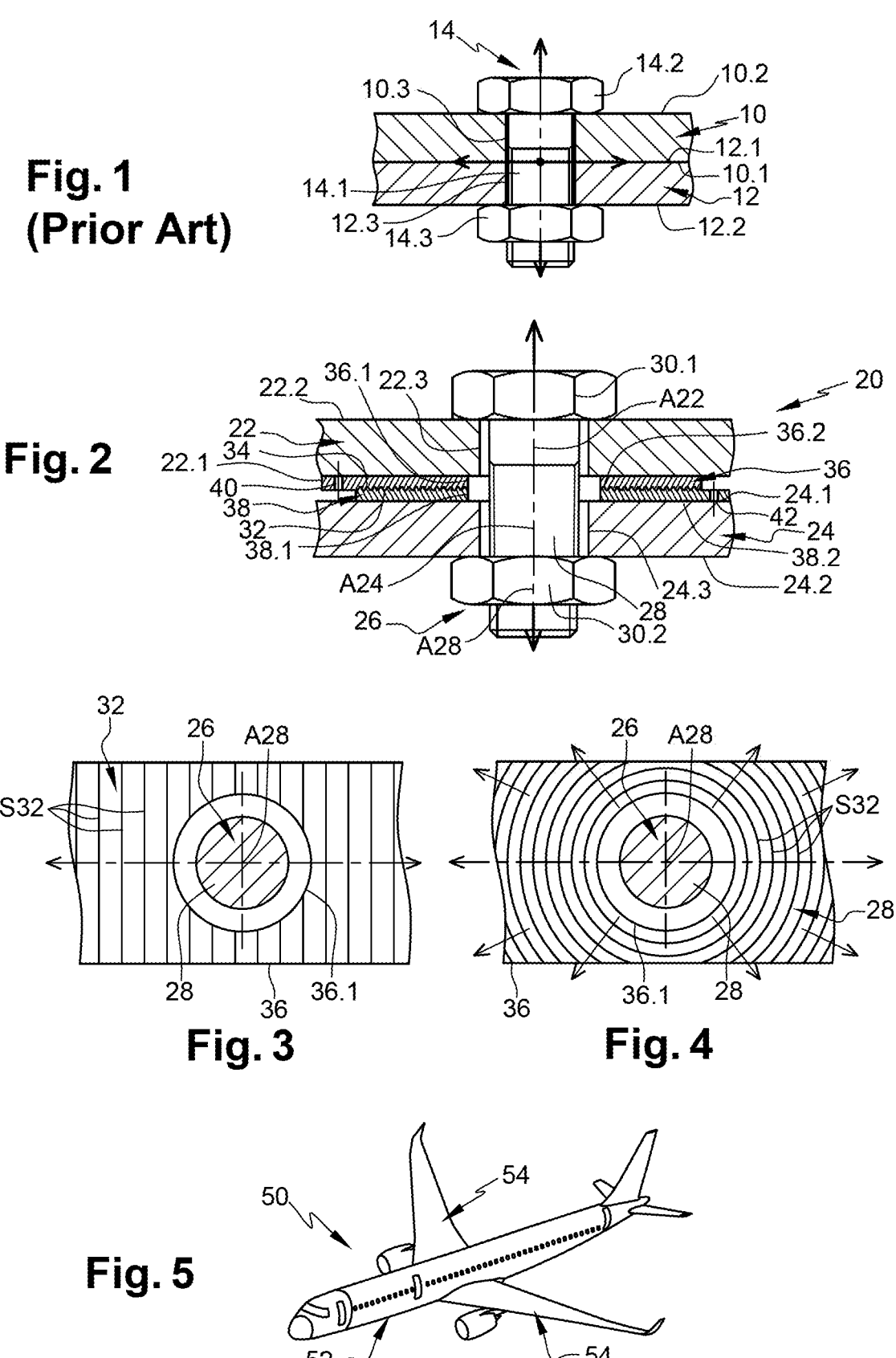
FIG. 1 is a cross section through an assembly illustrating an embodiment of the prior art.
FIG. 2 is a cross section through an assembly illustrating an embodiment of the invention.
FIG. 3 is a face-on view of a part of a contact surface illustrating an embodiment of the invention.
FIG. 4 is a face-on view of a part of a contact surface illustrating another embodiment of the invention.
FIG. 5 is a perspective view of an aircraft.
Figures 6, 7, 8, 9:
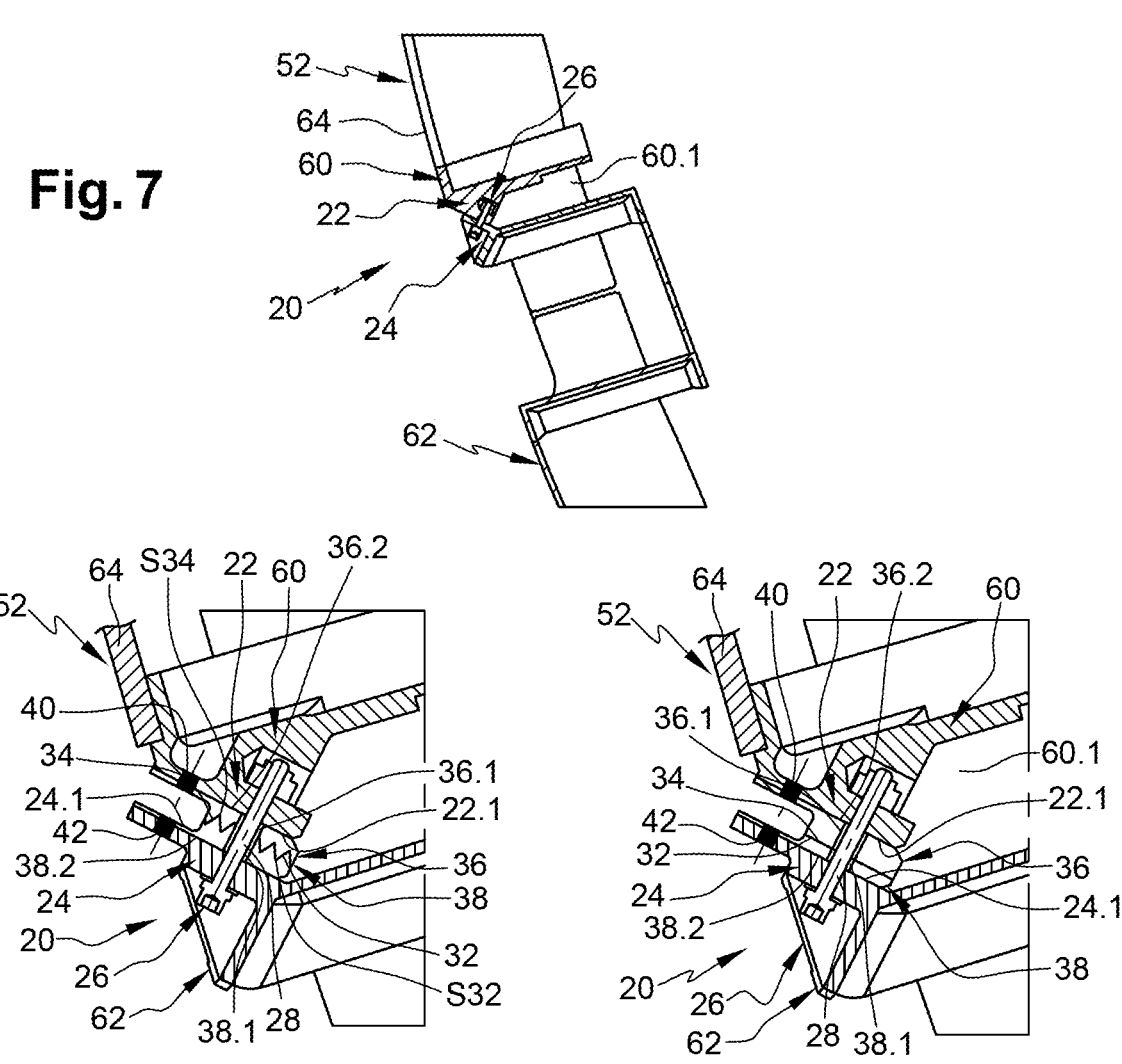
FIG. 6 is a perspective view of a part of a fuselage of an aircraft comprising a removable structure connected to a fixed structure by at least one assembly illustrating an embodiment of the invention.
FIG. 7 is a cross section through a part of the removable and fixed structures shown in FIG. 6, connected by at least one assembly.
FIG. 8 is a cross section through the assembly shown in FIG. 7 illustrating a first embodiment of the invention.
FIG. 9 is a cross section through the assembly shown in FIG. 7 illustrating a second embodiment of the invention.

According to an embodiment shown in FIG. 2, an assembly 20 comprises at least first and second components 22, 24, the first component 22 comprising a first inner face 22.1 oriented toward the second component 24, a first outer face 22.2 opposite to the first inner face 22.1 and a first through hole 22.3 opening out on the first inner and outer faces 22.1, 22.2, the second component 24 comprising a second inner face 24.1 oriented toward the first component 22, a second outer face 24.2 opposite to the second inner face 24.1 and a second through hole 24.3 opening out on the second inner and outer faces 24.1, 24.2.

Around the first through hole 22.3, the first inner and outer faces 22.1, 22.2 are substantially flat and parallel to one another. The first through hole 22.3 has a first inside diameter and a first axis A22 substantially perpendicular to the first inner and outer faces 22.1, 22.2.

Around the second through hole 24.3, the second inner and outer faces 24.1, 24.2 are substantially flat and parallel to one another. The second through hole 24.3 has a second inside diameter and a second axis A24 substantially perpendicular to the second inner and outer faces 24.1, 24.2.

The assembly 20 comprises at least one connection element 26 connecting the first and second components 22, 24, comprising a rod 28 placed in the through holes 22.3, 24.3 and first and second stop elements 30.1, 30.2 connected by the rod 28 and configured to be pressed against the first and second outer faces 22.2, 24.2, respectively. According to an embodiment, the connection element 26 is a bolt or a rivet.

The rod 28 is cylindrical and has an axis A28 substantially perpendicular to the first and second outer faces 22.2, 24.2 of the first and second components 22, 24.

Each connection element 26 is configured to ensure transmission of the traction/compression forces between the first and second components 22, 24.

The rod 28 has an outside diameter which is smaller than the inside diameter of the first and second through holes 22.3, 24.3. Unlike in the prior art, the assembly 20 comprises a clearance of greater than 1 mm, generally greater than 2 mm, between the rod 28 and at least one of the first and second components 22, 24. Consequently, the rod 28 is not configured to ensure transmission of the shear forces and the first and second through holes 22.3, 24.3 are not necessarily coaxial.

According to the invention, the first and second through holes 22.3, 24.3 may be produced independently of one another, prior to assembly. Thus, the first and second components 22, 24 are not drilled simultaneously during assembly and the assembly method does not include a drilling step. This solution simplifies assembly since the first and second through holes 22.3, 24.3 may be produced before assembly of the first and second components 22, 24.

According to one configuration, the assembly 20 comprises a first clearance of greater than 2 mm between the rod 28 and the first component 22 and/or a second clearance of greater than 2 mm between the rod 28 and the second component 24.

Naturally, the invention is not limited to this embodiment for the connection element 26. According to another embodiment, the rod 28 has a first end connected to the first component by screwing the rod directly into a tapped hole made in the first component or indirectly into a nut such as a barrel nut positioned in a housing made in the first component 22. Whatever the embodiment, each connection element 26 comprises a rod 28 configured to ensure uptake of the traction/compression forces between the first and second components 22, 24.

The assembly further comprises at least one pair of first and second contact surfaces 32, 34, the first contact surface 32 being rigidly secured to the first component 22 and provided with first ridges S32, the second contact surface 34 being rigidly secured to the second component 24 and provided with second ridges S34, the first and second contact surfaces 32, 34 being pressed against one another, along a plane of contact P, in such a way that the first and second ridges S32, S34 are nested in one another so that the first and second components 22, 24 are immobilized relative to one another in at least one direction perpendicular to the axis A28 of the rod 28. "Ridges" means an alternating succession of grooves (recessed) and ribs (protruding).

The first and second ridges S32, S34 are configured to ensure transmission of the shear forces between the first and second components 22, 24. The first and second ridges S32, S34 have complementary shapes such that there is no space between the first and second contact surfaces 32, 34 when they are pressed against one another. The number and the shapes of the first and second ridges S32, S34 are adapted as a function of the shear forces to be transmitted. Naturally, the invention is not limited to ridges as shapes for ensuring transmission of the shear forces between the first and second components 22, 24. Thus, the ridges may be replaced by other bumps. More generally, the first and second contact surfaces 32, 34 respectively comprise first and second bumps having complementary shapes configured to nest in one another when the first and second contact surfaces 32, 34 are pressed against one another and to ensure transmission of the shear forces between the first and second components 22, 24.

According to the invention, the uptake of the traction/compression forces is separate from the uptake of the shear forces, each of them being ensured by different elements, namely the connection element 26 for the traction/compression forces and the pair of first and second contact surfaces 32, 34 provided with bumps for the shear forces. Consequently, it is possible to optimize the dimensioning of the connection element 26 for the uptake of the traction/compression forces (without taking into account the shear forces) and the dimensioning of the first and second ridges S32, S34 for the uptake of the shear forces (without taking into account the traction/compression forces).

According to a first configuration shown in FIG. 3, the first and second ridges S32, S34 are rectilinear and parallel to one another and oriented in a direction perpendicular to a direction of uptake of the shear forces. This first configuration allows uptake of the shear forces in a preferred direction perpendicular to the direction of the ridges S32, S34.

According to a second configuration shown in FIG. 4, the first and second ridges S32, S34 are circles that are concentric around the rod 28 of the connection element 26. This second configuration allows uptake of the shear forces in any direction.

According to one arrangement, the first and second ridges S32, S34 have a height of between 1 and 5 mm. Each ridge S32, S34 comprises two sides which are inclined, forming an angle of between 10 and 45° relative to a straight line perpendicular to the inner face 22.1, 24.1 of the first or second component 22, 24. The ridges S32, S34 may have pointed, rounded or truncated tops.

According to an embodiment, for at least one of the first and second components 22, 24, at least one ridged contact surface 32, 34 corresponds to the inner face 22.1, 24.1 of the first or second component 22, 24.

According to another embodiment, for the first and second components 22, 24, the first and second contact surfaces 32, 34 correspond respectively to the first and second inner faces 22.1, 24.1 of the first and second components 22, 24.

According to another embodiment, the assembly 20 comprises at least one plate 36, interposed between the first and second inner faces 22.1, 24.1 of the first and second components 22, 24, the plate 36 being rigidly secured to a first element out of the first and second components and comprising a first contact surface 32 provided with first ridges S32 oriented toward a second element, different from the first element, out of the first and second components 22, 24, the second element comprising a second contact surface 34 provided with second ridges S34 and pressed against the first contact surface 32. According to one arrangement, the plate 36 includes at least one through hole 36.1 for receiving the rod 28 of a connection element 26. This arrangement makes it possible to hold in place the plate 36 through which the connection element 26 passes before it is tightened.

According to an embodiment, the assembly 20 comprises at least one attachment element 40 connecting the plate 36 and the first element, this (or these) attachment element(s) 40 being configured to ensure at least partial uptake of the shear forces between the plate 36 and the first element. This (or these) attachment element(s) 40 is (are) dimensioned as a function of the shear forces to be transmitted between the first and second components 22, 24.

Each attachment element 40 comprises a rod having a given section as a function of the shear forces to be transmitted. By way of example, each attachment element 40 is a shear pin, screw or rivet. For each attachment element 40, the plate 36 and the first element each comprise a housing, such as a through hole for example, configured to receive the rod of the attachment element 40, said housing having a section adapted to that of the rod of the attachment element 40. By way of indication, a clearance of the order of 1/100th to 2/100th is provided between the wall of each housing and the rod of the attachment element 40 to allow the insertion of the attachment element 40 in the housing. As a variant, the attachment element 40 could be force fitted in its housing.

According to an embodiment shown in FIG. 2, the assembly 20 comprises first and second plates 36, 38, interposed between the first and second inner faces 22.1, 24.1 of the first and second components 22, 24, the first and second plates 36, 38 being respectively rigidly secured to the first and second components 22, 24 and comprising respectively the first and second contact surfaces 32, 34 provided with the first and second ridges S32, S34. According to this embodiment, the first and second contact surfaces 32, 34 are distinct from the first and second components 22, 24. According to one arrangement, the first and second plates 36, 38 each include at least one through hole 36.1, 38.1 for receiving the rod 28 of a connection element 26.

According to one configuration, the first inner face 22.1 of the first component 22 is flat and smooth. Complementarily, the first plate 36 is connected to the first component 22 by at least one first attachment element 40 and comprises a flat and smooth first face 36.2 pressed against the first inner face 22.1 of the first component 22 and a first contact surface 32 opposite to the flat and smooth first face 36.2, provided with first ridges S32 and oriented toward the second plate 38. The second inner face 24.1 of the second component 24 is flat and smooth. Complementarily, the second plate 38 is connected to the second component 24 by at least one second attachment element 42 and comprises a flat and smooth second face 38.2 pressed against the second inner face 24.1 of the second component 24 and a second contact surface 34 opposite to the flat and smooth second face 38.2, provided with second ridges S34 and oriented toward the first plate 36. The attachment elements 40, 42 are configured to ensure uptake of the shear forces between the first plate 36 and the first component 22 and between the second plate 38 and the second component 24. They are dimensioned as a function of the shear forces to be transmitted between the first and second components 22, 24.

By way of example, the first and second attachment elements 40, 42 are shear pins, rivets or bolts. Naturally, the invention is not limited to this embodiment for rigidly securing a plate and a component. As a variant, the first or second plate 36, 38 could be adhesively bonded or welded to the first or second component 22, 24. A first or second plate 36, 38 may be connected to the first or second component 22, 24 by one or more attachment element(s) 40, 42. Whatever the embodiment, each plate 36, 38 is connected to the first or second component 22, 24 by at least one attachment element 40, 42 configured to ensure at least partial transmission of the shear forces between the first and second components 22, 24.

According to an embodiment, each plate 36, 38 comprises a single through hole 36.1, 38.1. In this case, a single connection element 26 passes through the plate 36, 38. According to another embodiment shown in FIG. 10, each plate 36, 38 comprises several through holes 36.1, 38.1. In this case, several connection elements 26 pass through the plate 36, 38.

According to an embodiment shown in FIG. 2, the first and second plates 36, 38 protrude relative to the first and second inner faces 22.1, 24.1 of the first and second components 22, 24.

Figures 10, 11, 12:
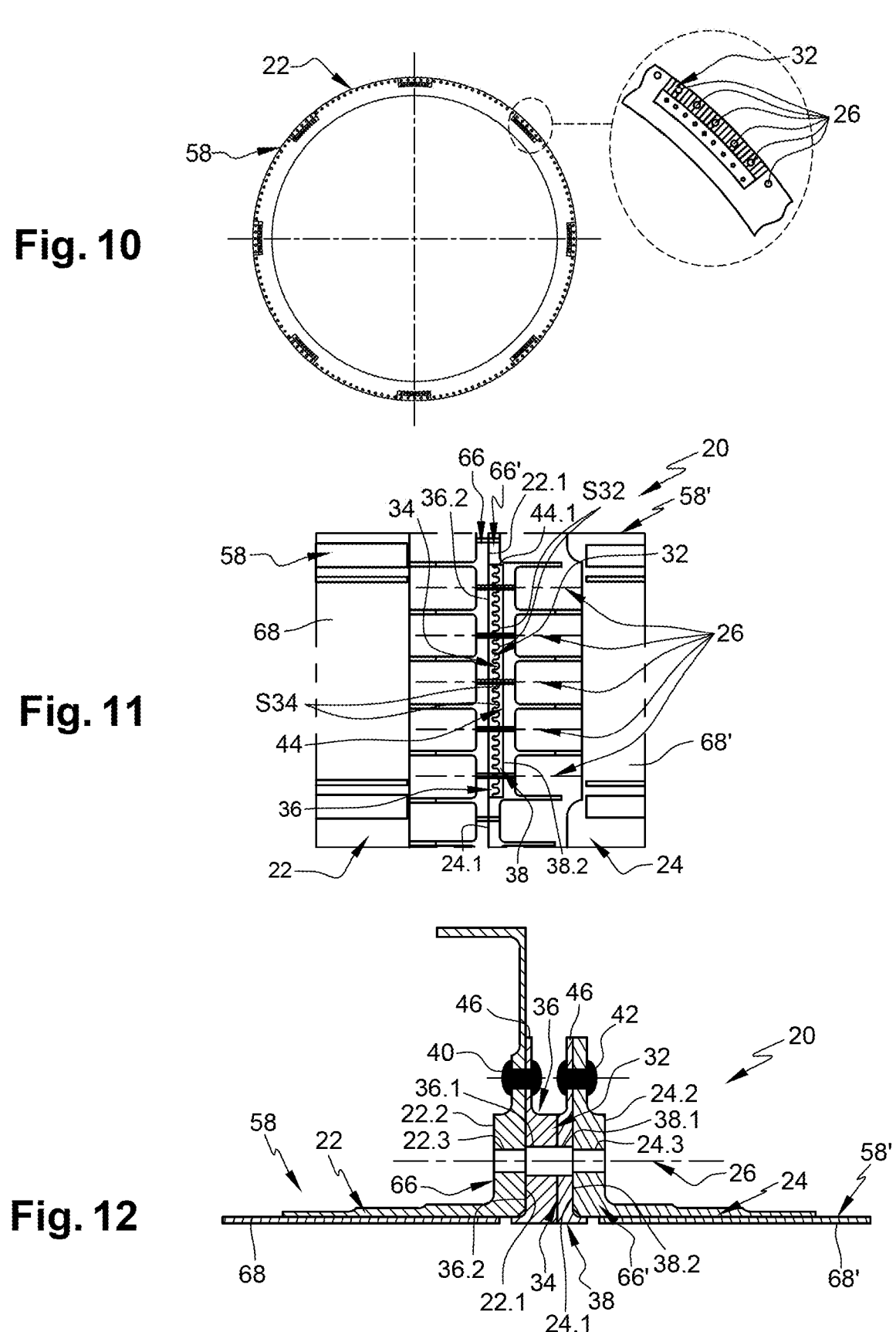
FIG. 10 is a cross section through a fuselage of an aircraft illustrating an embodiment of the invention.
FIG. 11 is a face-on view of an assembly connecting two fuselage portions illustrating an embodiment of the invention.
FIG. 12 is a section along the line A-A in FIG. 11 of an assembly illustrating an embodiment of the invention.

According to another embodiment shown in FIG. 11, at least one component out of the first and second components 22, 24 comprises at least one housing 44 which is recessed relative to the first or second inner face 22.1, 24.1 of the first or second component 22, 24, configured to receive at least one first or second plate 36, 38. The housing 44 has a contour 44.1 substantially identical to that of at least one of the first and second plates 36, 38. The housing 44 has a depth (dimension considered perpendicular to the first or second inner face 22.1, 24.1) configured to receive at least one of the first and second plates 36, 38. According to one configuration, the first component 22 comprises a first housing 44 configured to receive the first plate 36 and the second component 24 comprises a second housing configured to receive the second plate 38. According to another configuration shown in FIG. 11, only the first component 22 comprises a housing configured to receive the first and second plates 36, 38.

According to one arrangement, at least one plate 36, 38 and its housing 44 are configured to ensure at least partial uptake of the shear forces between the plate 36, 38 and the first or second component 22, 24 in which the housing 44 is made.

As shown in FIG. 12, each plate 36, 38 comprises an extension 46 (which does not interact with the other plate) through which at least one attachment element 40, 42 passes. According to an embodiment shown in FIG. 12, the extension 46 has a thickness smaller than that of the rest of the plate 36, 38.

For a first assembly, the first plate 36 is connected to the first component 22 by virtue of a first attachment element 40, then the second plate 38, not connected to the second component 24, is positioned relative to the first plate 36 and held assembled to the latter by a temporary connection such as an adhesive for example. Next, the second component 24 is positioned relative to the second plate 38 and connected to the latter by virtue of a second attachment element 42. Lastly, the connection element 26 is put in place and tightened.

According to one mode of operation, an assembly method comprises a step of positioning the first and second plates 36, 38 between the first and second components 22, 24, at least one of them not being rigidly secured to the first or second component 22, 24, a step of positioning the first and second components 22, 24 relative to one another in a desired position, a step of holding the first and second components 22, 24 in this desired position by putting in place at least one connection element 26, the first and second ridges S32, S34 nesting in one another as it is put in place, a step of attaching the first and second plates 36, 38, not yet rigidly secured, respectively to the first and second components 22, 24, each of the first and second plates 36, 38 being rigidly secured to the first or second component 22, 24 by at least one attachment element 40, 42 configured to ensure at least partial transmission of the shear forces between the first and second components 22, 24.

According to one application, an aircraft 50 comprises at least one assembly 20 as described above.

In a known manner, the aircraft 50 comprises a fuselage 52, wings 54 positioned on either side of the fuselage 52 and a center wing box 56 (shown in FIG. 13) connecting the wings 54 and the fuselage 52. The latter comprises several portions 58 positioned end to end.

According to a first application shown in FIGS. 6 to 9, the fuselage 52 comprises a frame 60 delimiting an opening 60.1, a removable panel 62 configured to close off the opening 60.1 and at least one assembly 20 connecting the panel 62 and the frame 60. According to this application, the frame 60 corresponds to the first component 22 of the assembly 20 and the panel 62 corresponds to the second component 24 of the assembly 20.

According to one arrangement, the fuselage comprises several assemblies 20 distributed around the periphery of the panel 62.

Each assembly 20 comprises a connection element 26 and first and second plates 36, 38 connected respectively to the frame 60 and to the panel 62. According to a first variant shown in FIG. 8, the first and second ridges S32, S34 are circular and concentric around the connection element 26. According to a second variant shown in FIG. 9, the first and second ridges S32, S34 are rectilinear and parallel to one another.

The fuselage 52 comprises an external wall 64 forming the skin of the aircraft 50. According to one arrangement, each assembly 20 has a plane of contact P which forms with the external wall 64 an angle of the order of 45°. This inclination of the plane of contact P facilitates reassembly of the panel 62.

According to a second application shown in FIGS. 10 to 12, the fuselage 52 comprises at least two portions 58, 58' connected by at least one assembly 20. Each portion 58, 58' of the fuselage 52 comprises several transverse reinforcements 66, 66' and an external wall 68, 68' attached on the transverse reinforcements 66, 66'. The first and second portions 58, 58' respectively comprise first and second transverse reinforcements 66, 66' pressed against one another, at least one assembly 20 connecting the first and second transverse reinforcements 66, 66' which correspond respectively to the first and second components 22, 24 of the assembly 20.

The assembly 20 connecting the first and second portions 58, 58' comprises several pairs of first and second plates 36, 38 distributed regularly around the first and second transverse reinforcements 66, 66', the first plates 36 being connected to the first transverse reinforcement 66, the second plates 38 being connected to the second transverse reinforcement 66'. Each first or second plate 36, 38 takes the form of a sector of a ring which has the same radius of curvature as the first or second transverse reinforcement 66, 66' to which it is connected. According to one arrangement, the assembly comprises eight pairs of first and second plates 36, 38.

Each of the first and second plates 36, 38 is connected to the first or second transverse reinforcement 66, 66' by several attachment elements 40, 42. Each of the first and second plates 36, 38 has several connection elements 26 passing through it.

Figures 13, 14, 15:
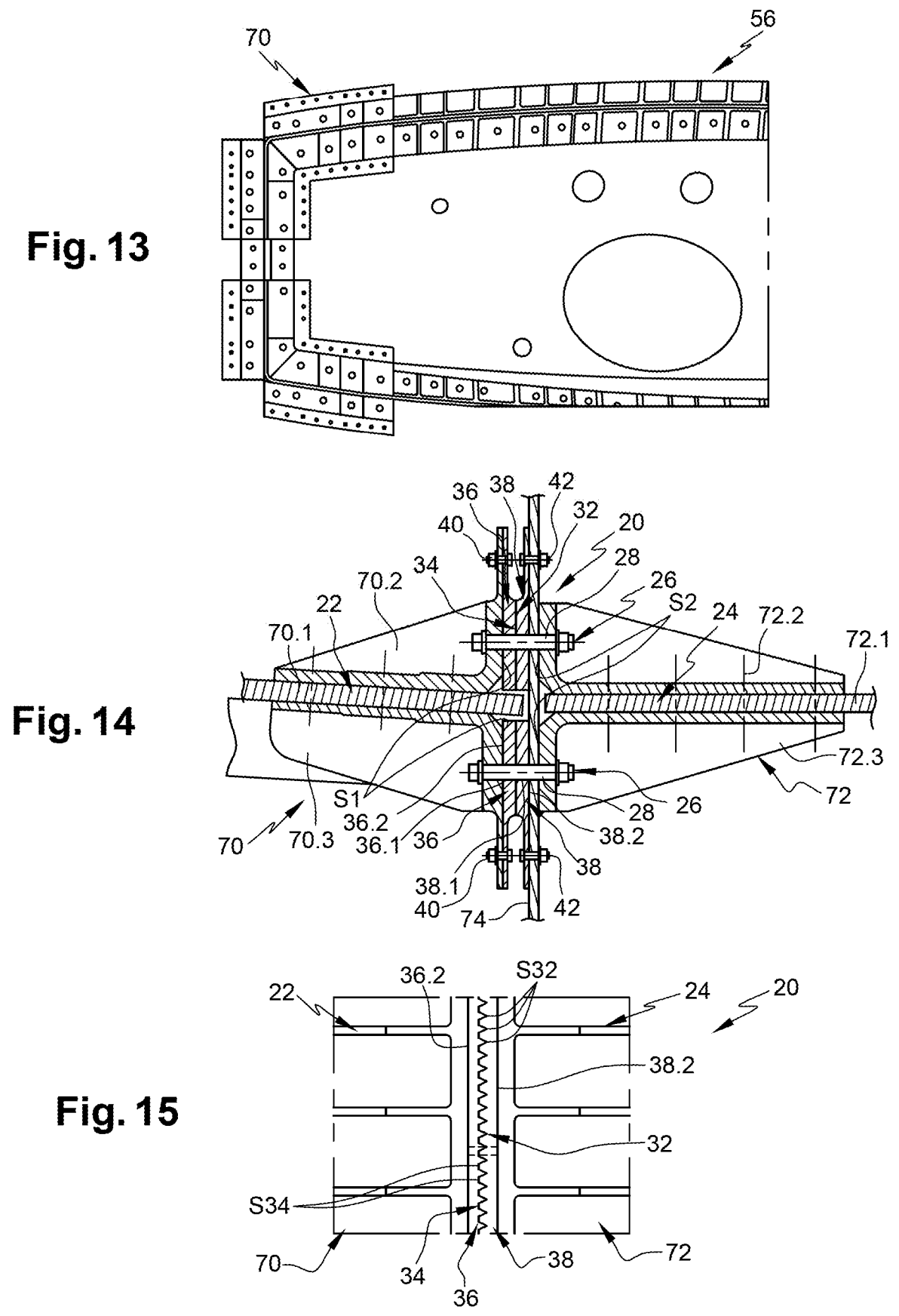

According to a third application shown in FIGS. 13 to 15, the center wing box 56 comprises a first structure 70, a second structure 72 and at least one assembly 20 connecting the first and second structures 70, 72, the first and second structures corresponding respectively to the first and second components 22, 24 of the assembly 20.

The first structure 70 comprises at least one first panel 70.1 and at least one first bracket 70.2 connected to the first panel 70.1. According to one arrangement, the first structure 70 comprises at least one first panel 70.1 and, for each first panel 70.1, two first brackets 70.2, 70.3 arranged on either side of the first panel 70.1. The first brackets 70.2, 70.3 have first coplanar junction surfaces S1.

The second structure 72 comprises at least one second panel 72.1 and at least one second bracket 72.2 connected to the second panel 72.1. According to one arrangement, the second structure 72 comprises at least one second panel 72.1 and, for each second panel 72.1, two second brackets 72.2, 72.3 arranged on either side of the second panel 72.1. The second brackets 72.2, 72.3 have second coplanar junction surfaces S2.

The assembly 20 comprises at least one pair of first and second plates 36, 38, the first plate 36 of each pair being connected to a first bracket 70.2, 70.3 and pressed against the first junction surface S1, the second plate 38 of each pair being connected to a second bracket 72.2, 72.3.

The assembly 20 may comprise one or more pair(s) of first or second plates 36, 38, each of the first and second plates 36, 38 being connected to a first or second bracket 70.2, 70.3, 72.2, 72.3 by one or more attachment element(s) 40, 42 and having one or more connection element(s) 26 passing through them.

According to one arrangement shown in FIG. 14, the second structure 72 comprises a partition 74, substantially perpendicular to the second panel 72.1, interposed between the second plates 38 and the second brackets 72.2, 72.3.

Figure 16A:
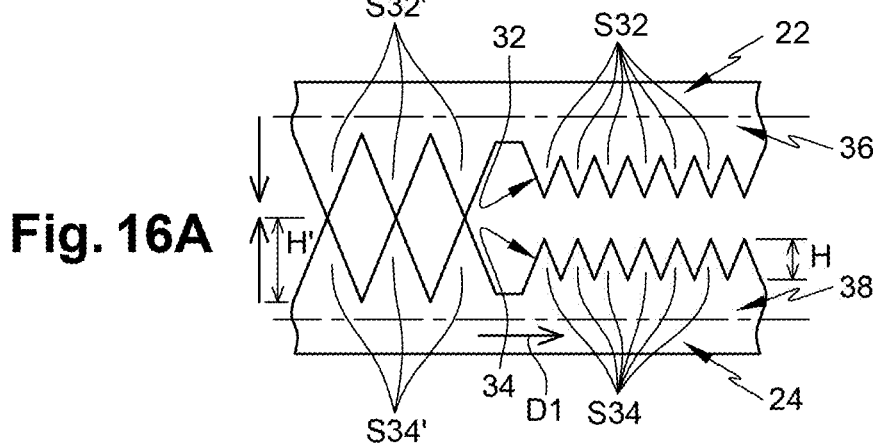
FIG. 16A is a cross section through first and second plates illustrating an embodiment of the invention, before tightening, and, FIG. 16B is a cross section through first and second plates illustrating an embodiment of the invention, after tightening.
Figure 16B:
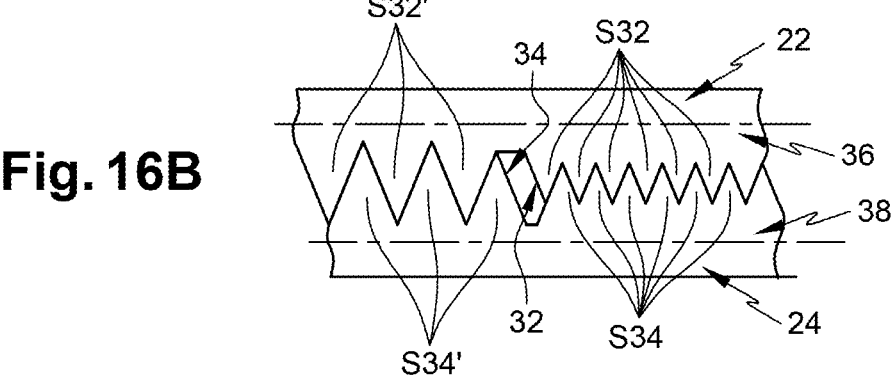

According to an embodiment shown in FIGS. 16A and 16B, after disassembly, the first and second plates 36, 38 are used to reposition the first and second components 22, 24 upon reassembly.

As shown in FIGS. 16A and 16B, the ridges S32, S34 of one and the same assembly may not be all identical. Thus, one and the same pair of contact surfaces 32, 34 comprises a first series of first and second ridges S32, S34 dimensioned to ensure uptake of the shear forces, and a second series of first and second ridges S32', S34' configured to ensure repositioning of the first and second components 22, 24 relative to one another and uptake of at least some of the shear forces. The first and second ridges S32', S34' of the second series have a height H' greater than the height H of the first and second ridges S32, S34 of the first series.

As a variant, the first or second ridges S32, S34 are all identical and configured to ensure repositioning of the first and second components 22, 24 relative to one another and uptake of the shear forces. Whatever the variant, the first and second ridges S32, S34, S32', S34' are configured (height, inclination, orientation) to reposition the first and second components 22, 24 in the same position as they were in upon first assembly, during the various subsequent reassemblies.

According to one mode of operation, upon disassembly and until reassembly, the first and second plates 36, 38 remain rigidly secured to the first and second components 22, 24, respectively. Upon reassembly, the first and second ridges S32', S34' are positioned in such a way as to make the same ridges S32', S34' interact with one another as upon first assembly. As shown in FIG. 16A, since the ridges S32', S34' are not completely nested in one another, the first and second components 22, 24 may shift relative to one another. As the connection element 26 (or connection elements 26) is tightened, the ridges S32', S34' become nested in one another. Owing to the inclined sides of the ridges S32', S34', if necessary, the first and second components 22, 24 move relative to one another in such a way as to take up the same position as upon first assembly.

As shown in FIGS. 16A and 16B, the first and second ridges S32', S34' are oriented as a function of the movement D1 desired between the first and second components 22, 24 during repositioning. Thus, upon first assembly, the ridges S32, S34 are oriented as a function of the movement D1 to be performed between the first and second components 22, 24 so as to make up for the deformations of at least one of them upon disassembly. If the first and second components 22, 24 have a tendency to deform in a direction D1 upon disassembly and if a movement in the direction D1 but in the opposite sense between the first and second components 22, 24 is necessary during reassembly, the ridges S32, S34 are oriented upon first assembly such that their crests are oriented perpendicularly to the direction D1.

If the first and second components 22, 24 are large, the first and second ridges S32, S34 of the assembly are not necessarily all oriented in the same way. If a first zone of one of the components 22, 24 has a tendency to deform in a first direction, the first and second ridges S32, S34 in this first zone will be oriented perpendicularly to this first direction. If a second zone of one of the components 22, 24 has a tendency to deform in a second direction (secant to the first direction), the first and second ridges S32, S34 in this second zone will be oriented perpendicularly to the second direction.

According to one mode of operation, upon first assembly, the first and second ridges S32, S34 are configured not only as a function of the shear forces to be transmitted between the first and second components 22, 24 but also as a function of the deformations of the first and second components 22, 24 upon disassembly so as to make up for said deformations upon reassembly. Thus, if the first and second components 22, 24 move relative to one another in at least one first direction upon disassembly, the first and second ridges S32, S34 are oriented perpendicularly to said at least one first direction upon first assembly.

If, upon disassembly, the first and second components 22, 24 deform relative to one another differently from one zone to the next, the first and second ridges S32, S34 are configured, upon first assembly, zone by zone as a function of the deformations of the first and second components 22, 24 upon disassembly.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:

at least a first component and a second component, and at least one connection element comprising a rod configured to ensure uptake of traction/compression forces between the first and second components, wherein the first component comprises a first inner face oriented toward the second component and a first through hole configured to receive the rod, wherein the second component comprises a second inner face oriented toward the first component and a second through hole configured to receive the rod, wherein the assembly further comprises;

at least one first plate interposed between the first and second inner faces, the first inner face of the first component being flat and smooth, wherein the at least one first plate is connected to the first component by at least one first attachment element configured to at least partially uptake shear forces between the first and second components, said at least one first plate comprising a flat and smooth first face pressed against the first inner face of the first component, and at least one second plate interposed between the first and second inner faces, the first inner face of the second component being flat and smooth, wherein the at least one second plate is connected to the second component by at least one second attachment element configured to at least partially uptake shear forces between the first and second components, said at least one second plate comprising a flat and smooth first face pressed against the first inner face of the second component, and wherein the assembly further comprises at least one pair of first and second contact surfaces pressed against one another, the first contact surface being a surface of the at least one first plate which is opposite to the flat and smooth first face of the at least one first plate and comprising first bumps, the second contact surface being a surface of the at least one second plate which is opposite to the flat and smooth first face of the at least one second plate and comprising second bumps, the first and second bumps having complementary shapes configured to nest in one another and transmit shear forces between the first and second components.

2. The assembly as claimed in claim 1, wherein each of the at least one first and second plates includes at least one through hole for receiving the rod.

3. The assembly as claimed in claim 1, wherein each of the at least one first and second plates comprises an extension through which at least one attachment element passes and having a thickness smaller than that of a remaining portion rest of said plate.

4. The assembly as claimed in claim 1, wherein at least one component of the first and second components comprises at least one housing recessed relative to the first or second inner face of the first or second component and configured to receive at least the first or second plate.

5. The assembly as claimed in claim 1, wherein the first bumps and the second bumps comprise, respectively, first ridges and second ridges.

6. The assembly as claimed in claim 5, wherein the first ridges and the second ridges are rectilinear and parallel to one another and oriented in a direction perpendicular to a direction of uptake of the shear forces.

7. The assembly as claimed in claim 5, wherein the first ridges and the second ridges are circles that are concentric around the rod of the connection element.

8. The assembly as claimed in claim 5, wherein the first ridges and the second ridges have a height between 1 and 5 mm.

9. An aircraft comprising:

at least one assembly, comprising:

at least a first component and a second component, and at least one connection element comprising a rod configured to ensure uptake of traction/compression forces between the first and second components, wherein the first component comprises a first inner face oriented toward the second component and a first through hole configured to receive the rod, wherein the second component comprises a second inner face oriented toward the first component and a second through hole configured to receive the rod, wherein the assembly further comprises:

at least one first plate interposed between the first and second inner faces, the first inner face of the first component being flat and smooth, wherein the at least one first plate is connected to the first component by at least one first attachment element configured to at least partially uptake shear forces between the first and second components, said at least one first plate comprising a flat and smooth first face pressed against the first inner face of the first component, at least one second plate interposed between the first and second inner faces, the first inner face of the second component being flat and smooth, wherein the at least one second plate is connected to the second component by at least one second attachment element configured to at least partially uptake shear forces between the first and second components, said at least one second plate comprising a flat and smooth first face pressed against the first inner face of the second component, and wherein the assembly further comprises at least one pair of first and second contact surfaces pressed against one another, the first contact surface being a surface of the at least one first plate which is opposite to the flat and smooth first face of the at least one first plate and comprising first bumps, the second contact surface being a surface of the at least one second plate which is opposite to the flat and smooth first face of the at least one second plate and comprising second bumps, the first and second bumps having complementary shapes configured to nest in one another and transmit shear forces between the first and second components.

10. The aircraft as claimed in claim 9, further comprising:

a frame delimiting an opening, and, a removable panel configured to close off the opening, the at least one assembly connecting the frame and the removable panel, wherein the frame and the removable panel correspond respectively to the first and second components.

11. The aircraft as claimed in claim 9, further comprising:

at least two fuselage portions comprising respectively first and second transverse reinforcements pressed against one another, the at least one assembly connecting the first and second transverse reinforcements, wherein the first transverse reinforcement and the second transverse reinforcement correspond respectively to the first and second components.

12. The aircraft as claimed in claim 9, further comprising:

a center wing box comprising a first structure, and, a second structure, the at least one assembly connecting the first structure and the second structure, wherein the first structure and the second structure correspond respectively to the first and second components.

13. A method for assembling the assembly of claim 1, the method comprising:

a step of positioning the at least one first plate and a second plate between the first component and the second component, at least one of the at least one first plate and the second plate not being rigidly secured to the first or second component, a step of positioning the first component and the second component relative to one another in a desired position, a step of holding the first component and the second component in the desired position by putting in place the at least one connection element, wherein the first and second ridges nest in one another as the at least one connection element is put in place, a step of attaching the at least one first plate and the second plate, not yet rigidly secured, respectively to the first and second components, each of the at least one first plate and the second plate being rigidly secured to the first or second component by at least one attachment element configured to ensure at least partial transmission of the shear forces between the first and second components.

14. The method as claimed in claim 13, wherein the first ridges and the second ridges are configured as a function of deformations of the first component and the second component upon disassembly so as to make up for said deformations upon reassembly.

15. The method as claimed in claim 13, wherein the first ridges and the second ridges are oriented, upon assembly, perpendicularly to at least one direction of movement of the first component and the second component relative to one another upon disassembly.

16. The assembly as claimed in claim 1, wherein the at least one first plate is rigidly fixed to the first component via at least one of: a first attachment element distinct from the at least one connection element, an adhesive bond, and a weld, and wherein the at least one second plate is rigidly fixed to the second component via at least one of: a second attachment element distinct from the at least one connection element, an adhesive bond, and a weld.

* * * * *